United States Patent Office 3,412,544
Patented Nov. 26, 1968

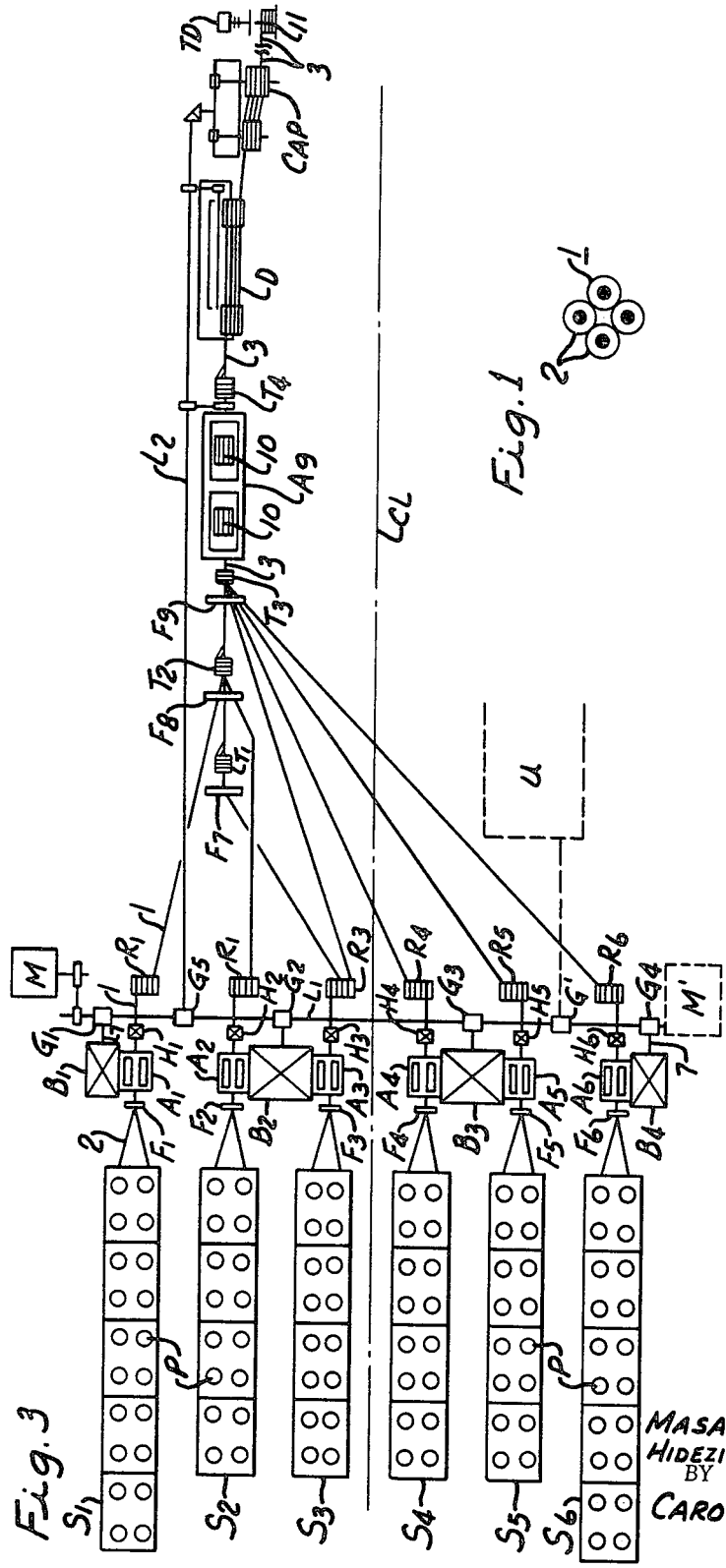

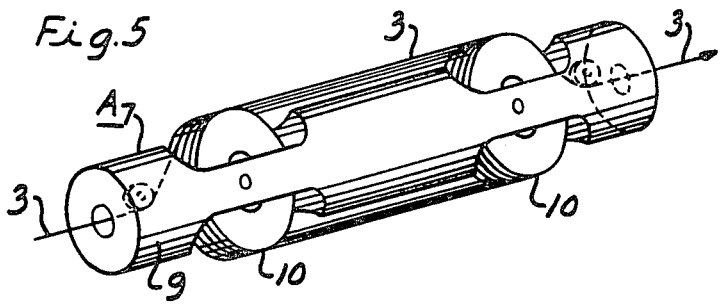
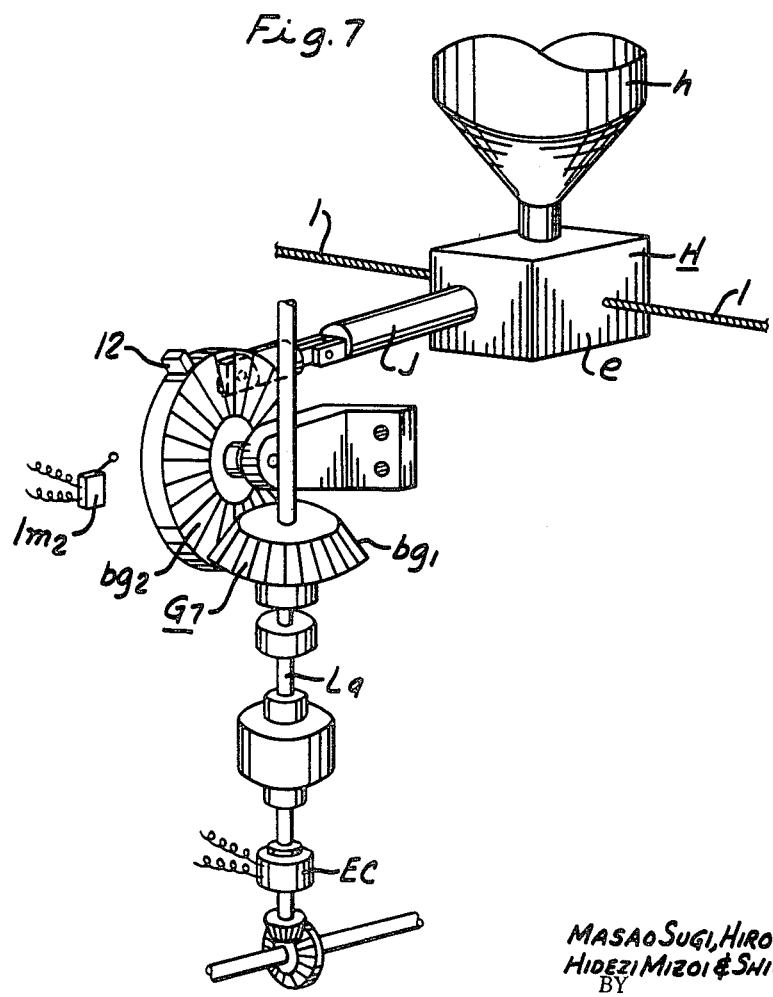

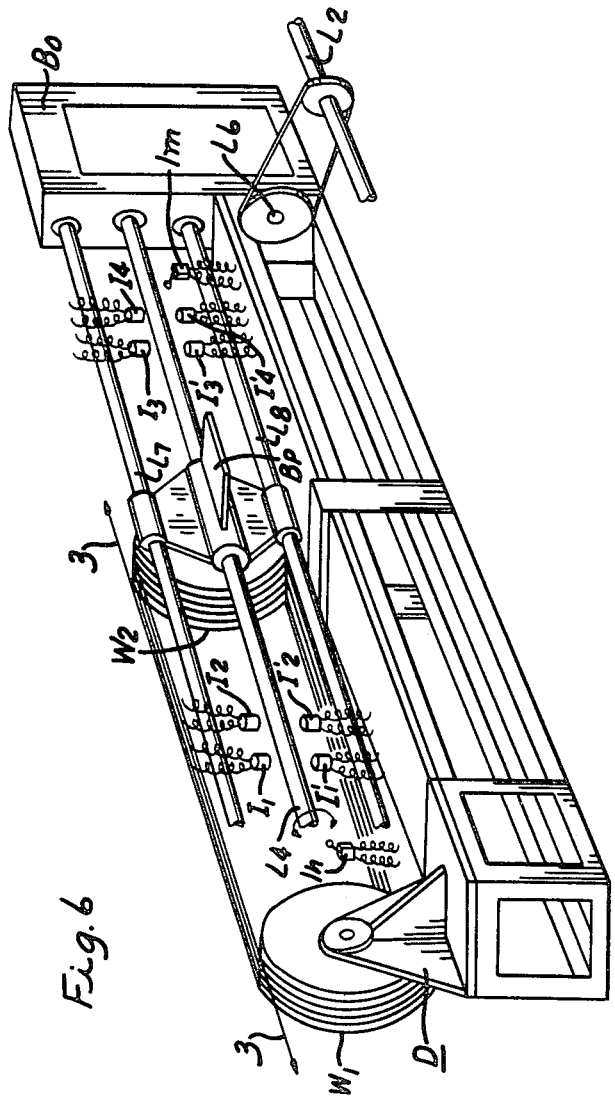

3,412,544
APPARATUS FOR THE MANUFACTURE OF
COMMUNICATION CABLE
Masao Sugi and Hiroyuki Kumamaru, Kamakura-shi, Hidezi Mizoi, Isogoku, and Shigeatsu Wada, Kohoku-ku, Japan, assignors to Sumitomo Electric Industries, Ltd., Osaka, Japan, a company of Japan
Filed Apr. 12, 1967, Ser. No. 630,447
Claims priority, application Japan, Apr. 14, 1966, 41/23,872
3 Claims. (Cl. 57—34)

ABSTRACT OF THE DISCLOSURE

An apparatus for the manufacture of a composite communication cable having alternating twists imparted to the groups of elementary wires making up the cable by changing the line speed of the elementary wires in two steps in a time wise rectangular wave form with a compulsory dancer roller system while the takeup speed of the cable remains constant. The machinery for assembling the wire groups into the composite cable may be readily divided to form more than one composite cable at the same time.

This invention relates to a novel manufacturing apparatus which makes actually practicable the method of stranding communication cable in alternating left-hand and right-hand twists using two step line speeds (hereinafter briefly called the SZ stranding). As methods of manufacturing communication cable of SZ stranding, one in which a rotary holed plate is used and one in which an accumulation revolution system is used are already known.

Summary of the invention

In the case of an already known SZ stranding apparatus of the holed plate revolution system or the accumulation revolution system, the group of elementary wires to be stranded together runs at a constant speed, while in the case of the apparatus of the present invention, the line speed in the part where the elementary wires are stranded together changes in two steps in a time wise rectangular wave form to produce SZ twists, although the speed to take up the cable remains constant. This is an essential difference from the apparatus heretofore in use.

The first characteristic of the present invention is that a plurality of stranding devices consisting of supply stands paying out the groups of elementary wires, accumulating devices for the stranding of quads or the like, devices for the application of an adhesive, and phase adjusting roller stands are arranged in several small groups and the arrangement of the equipment is such that they may easily be divided into several SZ quad assembling machines by adding prime motors and assembly take-up stands to these groups.

A second characteristic of the present invention is that the electric signal produced immediately before the time to reverse the direction of movement of the moving roller of the compulsory dancer rollers which produce the two-step line speed is used as the drive-starting signal of the drawing mechanism which commonly drives a plurality of pistons for forcing out an adhesive and a device which when added thereto makes the pistons stop at a fixed spatial position when the operation of the pistons is at a stop.

A third characteristic is that the accumulating devices for quad stranding may individually be cut off from the driving mechanism during the suspension of operation and may be freely revolved by hand and some of these accumulating devices may be put at a stop even while the whole line is operating, making it convenient also for the manufacture of cable units having few quads.

Other objects and advantages appear hereinafter in the following description and claims.

The accompanying drawings show for the purpose of exemplification without limiting the invention or claims thereto, certain practicable embodiments illustrating the principles of this invention wherein:

FIG. 1 is a cross-section of one cable quad making up the communication cable.

FIG. 2 is a view in cross-section of the composite communication cable.

FIG. 3 is a block diagram illustrating the apparatus of the present invention for the manufacture of the composite cable illustrated in FIG. 2.

FIG. 5 is a perspective view illustrating an accumulating device for the assembly of the stranded quads shown in FIG. 1.

FIG. 6 is a perspective view of the compulsory dancer system for changing the line speed of the elementary wires making up the composite cable.

FIG. 7 is a perspective view of the adhesive applying device as shown with the accumulator of FIG. 4.

Figure 4:
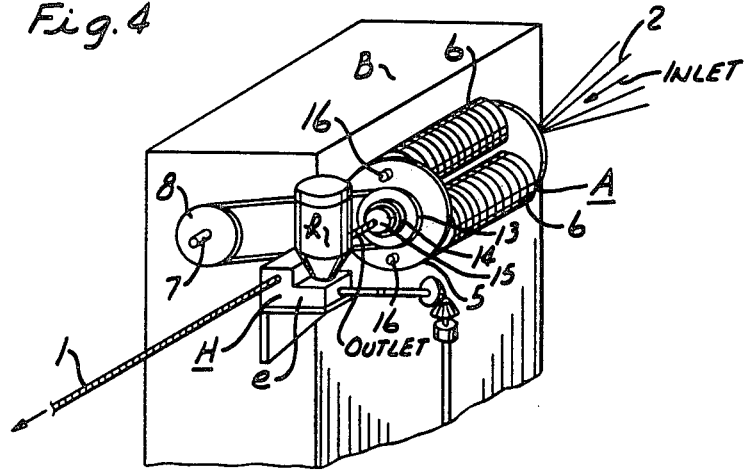
FIG. 4 is a perspective view of an accumulating device for quad-stranding the elementary wires as shown in FIG. 1.

FIGURE 1 shows a cross section of the communication cable quad ① obtained at the outlet of the quad stranding accumulating device mentioned later. Four lines of elementary wires ②, which are conductors with an insulating covering provided thereon, are laid each at one apex of a square, each line in contact with the others. The direction of their stranding is alternately reversed left and right, the stranded wire accumulating length of the accumulating device being made one section before reversal of the direction. FIGURE 2 shows a cross section of a communication cable unit ③ manufactured by the apparatus of FIGURE 3 described later. Quads ① of FIGURE 1 are assembled in three layers, having rough windings of yarn or plastic tape 4 provided between the layers and over the outermost layer. FIGURE 3 is the layout plan (block diagram) of the apparatus of the present invention for the manufacture of the cable unit ③ of FIGURE 2.

In FIGURE 3, $S_1$–$S_6$ are supply stands which house the group of supply packs P or supply reels with the elementary wires ② wound thereon and from which the elementary wires are payed out. As a supply device, a pack is superior to a reel in that the unit length of elementary wire can be made longer and the paying out tension of the elementary wire can be made less. From the supply stand $S_3$ are payed out 16 piece of elementary wires ② corresponding to 4 quads in total which consist of those for the 3 quads of the central layer of the cable unit of FIGURE 2 and those of one quad in the outermost layer. From supply stands $S_1$ and $S_2$ are paid out 20 pieces and 16 pieces of elementary wires ② respectively, these forming later the 9 quads in the intermediate layer of the cable unit of FIGURE 2. Supply stands $S_4$, $S_5$, $S_6$ pay out 16 pieces, 16 pieces, 20 pieces of elementary wires ② respectively, which form later 13 quads in the outermost layer of the cable unit of FIGURE 2 and form, together with one quad payed out from $S_3$ as mentioned above, the complete outermost layer consisting of 14 quads as shown in FIGURE 2. In the case of FIGURE 3, the gronp of supply stands contain 104 supply packs in total. It is, however, possible also to effect a dual supply of the elementary wires by doubling the number of packs to 208 and always keeping one half of them in a waiting position. The group of elementary wires coming out of each supply stand is divided into groups of four each, each group passes through one of the group of eye-plates $F_1$–$F_6$ for quad stranding to be given the positions of the elementary wire shown in FIGURE 1, and then enters the accumulating devices $A_1$–$A_6$ for quad stranding.

$A_6$ and $A_1$ each contains 5 accumulating devices for quad stranding, and $A_2$–$A_5$ each 4 devices. An example of the perspective view of an accumulating device for quad stranding is shown in FIGURE 4. $A_1$–$A_6$ are installed on the supporting stands $B_1$–$B_4$ as shown in FIGURE 3. Four or five accumulating devices for quad stranding are installed on a side of the supporting stand B one above another vertically. The accumulating device consists of the cradle ⑤ which revolves as a whole and the rows of free rollers ⑥ which are rotatably mounted with the cradle ⑤ on the shafts 16 and are freely rotatable, the group of elementary wires being helically wound on ⑥. Thus the length of the group of elementary wires lying between the inlet and the outlet of the accumulating device becomes an accumulation. The accumulating lengths of all the accumulating devices for quad stranding are selected to be about equal to one another. The revolving motion, which is the mechanical output of M, is transmitted to the interior of the supporting stands $B_1$, $B_2$, $B_3$, and $B_4$ via the line axis $L_1$ and gear boxes $G_1$, $G_2$, $G_3$, and $G_4$ respectively and, as shown in FIGURE 4, is transmitted to each of the accumulating devices for quad stranding via the revolving shaft ⑦ in the interior of the supporting stand and the pulley ⑧. The number of revolutions in one direction of each accumulating device for quad stranding is proportionate to the number of revolutions of line axis $L_1$ and consequently to the take-up speed of the cable unit. The number of revolutions of each accumulating device for quad stranding corresponding to a certain take-up speed is prescribed for the requisite pitch of quad stranding and is realized by means of the ratio of gears engaging with the revolving shaft ⑦ or the dimension of the groove diameter of the pulley ⑧.

The quad-stranded wires that have come out of the quad stranding devices pass through the crosshead of one of the group of adhesive application devices $H_1$–$H_6$ respectively and the portion of the stranded wires before and after the twist reversing point, including this point, is given an adhesive, as stated later, in order to prevent the untwisting of the stranded wires. Then, they pass through the phase regulating roller stands $R_1$–$R_6$ and go to the assembling device where the cable unit is assembled. The phase regulating roller stands consist of groups of simple guide rollers. The length of the quad-stranded wires from the outlets of their respective crossheads of adhesive application devices to the inlet of the accumulating device for assembling, described later, are made a little different from each other, so that the portions where an adhesive has been applied, namely the twist reversing points, of adjacent quads may not come near to each other when all the quads are assembled into a cable unit as shown in FIGURE 2, thus preventing the deterioration of inter-quad electrostatic coupling of the cable unit and also improving the mechanical bending characteristic of the unit. In addition, it is also possible to obtain additional effect by arranging a part of the said group of guide rollers $R_1$–$R_6$ such that they may have a part of the tension utilized to pull out the quad-stranded wires from the rotary accumulating device in the front stage borne by a torque motor or the like driven in the same direction to accelerate the quad-stranded wires engaged therewith. Here, the layout of the various devices from the supply stand to the phase regulating roller stand in FIGURE 3 is entirely symmetrical up and down with respect to the center line CL, with the exception of the prime motor M.

Referring to FIGURE 3, the quad-stranded wires, 9 lines in total consisting of the 5 lines coming from the group of $A_1H_1R_1$ and 4 lines from the group of $A_2H_2R_2$, are lead to the assembling holed plate $F_8$ to make the intermediate layer of the cable unit. Three of the 4 lines of quad-stranded wires from the group of $A_3H_3R_3$ are lead to the assembling holed plate $F_7$ to make the central layer, while the remaining one line and a subtotal of 13 lines of quad-stranded wires coming from the groups of $A_4H_4R_4$ and $A_6H_6R_6$, 14 lines in total, are lead to the assembling holed plate $F_9$ to make the outermost layer of the cable unit. The three quads coming out of $F_7$ are roughly lapped with cotton yarn or plastic tape supplied from the ordinary rough winding head $T_1$ and form the central layer shown in FIGURE 2. Over this layer are placed the 9 quads coming from $F_8$ which are then roughly lapped with yarn or tape from rough binding head $T_2$. Thus the layers up to the intermediate layer shown in FIGURE 2 are formed. Then the 14 quads coming from $F_9$ are placed over them and roughly lapped by means of the ordinary rough binding head $T_3$. This completes the construction whose cross section is shown in FIGURE 2.

The assembly ③ of quad-stranded wires that have come out of $T_3$ and come to have a cross section as shown in FIGURE 2 passes through the accumulating device $A_9$ for assembling and, at its outlet, is given a retaining binding of cotton yarn or plastic tape. Then it enters the compulsory dancer D which produces two-step line speed as described later. The construction of the accumualting device for assembling is, for example, that of a kind of double capstan which can revolve as a whole about the line of progress of the stranded wires as an axis. FIGURE 5 is a perspective view of an example of such construction. As shown, groups of rollers ⑩ and ⑩' which are freely rotatable are mounted on one cradle ⑨ to make a double capstan, ⑨ revolving in one direction about the line of progress of the stranded wires ③ as an axis of revolution. The length of stranded wires existing between the inlet and the outlet of $A_7$, namely the length of accumulation, is selected to be about equal to the length of accumulation of the accumulating device for quad stranding. $A_7$ is driven in one direction by the line shaft $L_2$, and $L_2$ is interconnected with the line shaft $L_1$ by means of the gear box $G_5$. The rough binding heads $T_1$–$T_4$ are driven by $L_2$ in a prescribed direction with a prescribed number of revolutions in the same direction as, or the opposite direction to, $A_7$. The cable unit ③ shown in FIGURE 2, which has come out of the compulsory dancer, is taken out to the right in the drawing at a constant speed by the take-up capstan, Cap, and is then taken up on a drum ⑪ by means of the take-up device TD.

FIGURE 6 shows a perspective view of an example of the compulsory dancer D. As stated later, the whole stranded wires, the groups of elementary wires, before entering D are given a low-and-high two-step line speed in a time-wise rectangular wave form by the reciprocating movement of the moving roller. If the running length of the stranded wires during each of the high speed and low speed durations is made about equal to the accumulation length of the accumulating device, an SZ stranded cable of alternately reversing twists whose unit section for twist reversal is the accumulation length will be obtained.

The apparatus illustrated in FIGURE 3 is one for manufacturing a cable unit consisting of a maximum of 26 quads. At the request of the cable user, however, it is sometimes found necessary to manufacture a cable unit having 13 or fewer quads. In such a case, it is permissible if the part of the apparatus shown above the center line CL of FIGURE 3 is utilized alone. This means, however, that the part of the equipment located below CL is put at a rest, so that there is a shortcoming that the utility of the equipment as a whole is decreased. To remedy this situation, a second prime motor M', gear box G', and a unit U quite similar to the assembling device from the holed plate F, to the take-up device TD of FIGURE 3 less the holed plate $F_9$ and a rough lapping head similar to $T_4$ and a line shaft similar to $L_2$ are added. When a cable unit having 14 or more quads is manufactured, these additional devices are kept at a rest. In case it is necessary to manufacture a cable unit having 13 or fewer the gear boxes $G_3$ and $G_4$ in FIGURE 3 are detached from $L_1$ and instead U and M are connected to the group of devices located below the center line CL and the quad-stranded wires coming from the phase regulating rollers $R_4R_5R_6$ are supplied to the second assembling device U. If this measure is taken, the apparatus shown in FIGURE 3 becomes one consisting of two 13-quad assembling devices, one above and one below the center line CL. The utility of the equipment as a whole will in this way be enhanced.

Next we will explain the interlocking mechanism between the compulsory dancer D and the group of adhesive applying devices $H_1$–$H_6$. FIGURE 6 is a perspective view of an example of the compulsory dancer D. D consists of a row $W_1$ of fixed rollers and row $W_2$ of moving rollers. $W_2$ is engaged on the helically threaded driving shaft $L_4$, having $L_7$ and $L_8$ as guide arms, and moves to left and right of the figure as $L_4$ revolves in the positive and the negative direction. In the positive-negative revolution gear box $B_0$, $L_4$ is connected with the input shaft $L_6$ via the positive-negative revolution clutch (not shown in the figure) and the force of revolution of $L_2$ is transmitted thereto. A light screening plate BP is provided for the row $W_2$ of moving rollers. To the left of BP are provided two illuminators $I_1$, and $I_2$ and light detectors $I_1'$, and $I_2'$ facing them respectively. To the right of BP are provided two illuminators $I_3$ and $I_4$ and light detectors $I_3'$ and $I_4'$ facing them respectively. $I_1$ and $I_4$ radiate thin beams of light to $I_1'$ and $I_4'$ respectively. The pairs of $I_1$ and $I_1'$, and others constitute a light switch, but these pairs may be substituted by other types of switches, such as proximity switches and limit switches. When the speed of the line before entering the compulsory dancer shown in FIGURE 3 is in the low speed period, the row $W_2$ of moving rollers shown in FIGURE 6 is moving to the left at a constant speed, and, when the light screening plate BP eventually cuts off the light beams from $I_1$ to $I_1'$, $I_1'$ issues an electric signal and actuates the reversing electromagnetic switch in the positive-negative revolution gear box $B_0$ to reverse the direction of revolution of the driving shaft $L_4$. Here, then the row $W_2$ of moving rollers moves to the right in FIGURE 6 at another constant speed. That is to say, the speed of the line before entering the compulsory dancer is made high. If the light screening plate BP cuts off the light beams from $I_4$ to $I_4'$, $I_4'$ issues an electric signal and again reverses the electromagnetic switch in the positive-negative revolution gear box $B_0$ and reverses the revolution of the driving shaft $L_4$ and in consequence, the row $W_2$ of moving rollers begins to move to the left this time. $W_2$ makes reciprocating movement left and right in this way. The limit switches $ln$, $lm$ provided to the left of $I_1$ and right of $I_4$ are for the purpose of emergency stop for suddenly stopping the movement of $W_2$ if and when the reversing action of the aforementioned row $W_2$ of moving rollers gets out of order as a result of the fault of the reversal mechanism.

The pairs of light switches $I_2$, $I_2'$ and $I_3$, $I_3'$ of a similar construction provided inside of the pairs of light switches $I_1$, $I_1'$, and $I_4$, $I_4'$ for issuing reversal signals respectively as shown in FIGURE 6, issue signals for the application of the adhesive when the light is shut off by the light screen plate BP. As is clear from the figure, the time the signal is issued is immediately before the signal for the reversal of $W_2$ is issued. If the light beams from the illuminator $I_2$ is shut off by the light screen plate BP and the detector $I_2$ issues an electric signal, that signal is given to the electromagnetic clutch EC shown in FIGURE 7.

FIGURE 7 is a perspective view of an example of the adhesive applying device H, for example, consists of a hopper $h$ where an adhesive is dissolved and stored, and a crosshead $e$ which applies an adhesive in a liquid or viscous condition to the stranded wires 1 in a thin layer. A fixed quantity of the adhesive in the hopper $h$ is sucked into the interior of the crosshead $e$ when the plunger $j$ moves to the left in FIGURE 7 and is applied onto the stranded wires 1 passing through $e$ when the plunger $j$ moves to the right. On the other hand, the main transmission is always revolving at a constant speed, and its output power is transmitted to the second bevel gear $bg_2$ of the reducer $G_7$ from the bevel gear $bg_1$ only when the electromagnetic clutch EC is ON upon receiving the electric signal from the light detector $I_2'$ or $I_3'$ shown in FIGURE 6, and the revolving movement of $bg_2$ is converted into the reciprocating movement of the plunger $j$. In this case, it is necessary that the plunger $j$ begins to force the adhesive into the crosshead $e$ of FIGURE 7, namely begins to apply the adhesive onto the stranded wires 1 passing through $e$, after the light detector $I_2'$ or $I_3'$ of FIGURE 6 becomes ON and before the light detectors $I_1'$ or $I_4'$ for issuing a reversal signal becomes ON. Furthermore, it is also necessary that the plunger $j$ continues forcing out the adhesive at least until $I_1'$ or $I_4'$ becomes ON, the direction of the twist of the stranded wires 1 changes from S to Z or from Z to S and that part of twist reversal has passed through the crosshead $e$ of FIGURE 7. Then, the adhesive is applied to the whole of the twist reversing part, and when it has dried up and solidified, the untwisting of the twist reversing part is prevented. Moreover, the plunger $j$ stops its movement after completing the application of the adhesive to the twist reversing part of the stranded wires 1, but it is desirable that the position where the plunger stops is a position which is convenient for it to begin its movement for the next application of the adhesive, namely, a position where the plunger $j$ has come through farthest from the crosshead $e$.

In order to give a desirable value to the speed of movement of the aforementioned plunger $j$ and the position to stop at, the present invention adopts the following measure. The time required for the movement of the light screen plate BP of FIGURE 6 between $I_2$ and $I_1$ or $I_3$ and $I_4$ is selected to be a little shorter than the time required for the movement of the plunger $j$ from the position farthest from the crosshead $e$ to the position deepest in it to force out the adhesive. In other words, the distances between $I_1$ and $I_2$ and $I_3$ and $I_4$ are so determined. If this is done, $I_2'$ and consequently the electromagnetic clutch EC, becomes ON before BP puts $I_1'$ to ON and the twist reversing part passes through the crosshead $e$, and the plunger $j$ begins to force out the adhesive and continues applying the adhesive until the twist reversing part has passed through the crosshead $e$. On the other hand, in order to have the plunger $j$ come to a stop at a fixed position, a protrusion 12 as shown in the figure is provided, for example, on the output side of the bevel gear $bg_2$, and a limit switch $lm_2$ which issues an electric signal when the protrusion 12 touches it is provided in such a position that the protrusion 12 touches it when the plunger $j$ comes farthest from the crosshead $e$, and the aforementioned electromagnetic switch EC is set to be OFF by the output signal from $lm_2$. If arranged as described above, the plunger $j$ always stops at a position a little after the contact of the protrusion 12 with $lm_2$, namely in the neighborhood of the position where the plunger $j$ has come farthest out of the crosshead $e$.

In the example shown in FIGURE 4, four or five pieces of adhesive applying devices are put upon one another vertically corresponding to the accumulating devices for quad stranding. If their constructions are made quite similar and they are driven jointly by means of the driving shaft $L_9$ of FIGURE 7, it will be sufficient to have only one set of the protrusion 12 and limit switch $lm$ coupled with the driving shaft $L_9$. The position where it needs to be attached is not necessarily on the bevel gear $bg_2$, but it may be shifted to various other places on $L_9$. Needless to say, $lm$ need not necessarily be a contact type switch, but it may be of a non-contact type like a proximity switch or photoswitch.

Figure 8:
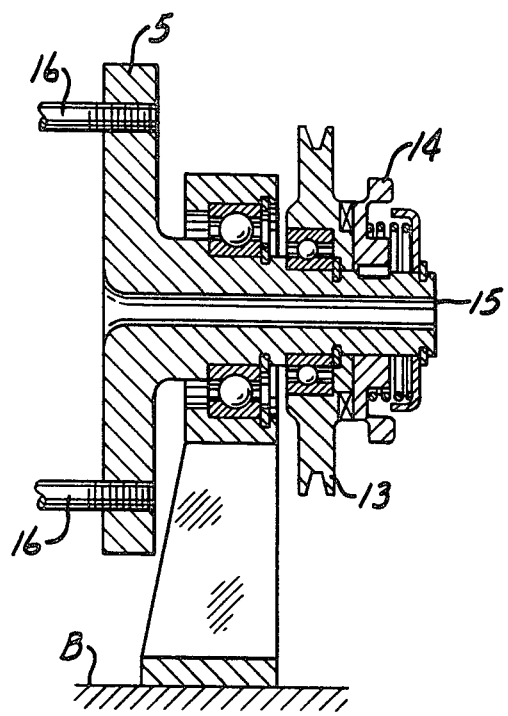
FIG. 8 is an axial cross-sectional view in side elevation of the accumulator as shown in FIG. 4.

When the groups of elementary wires to be stranded are put through each of the accumulating devices before manufacturing the cable unit by the apparatus shown in FIGURE 3, namely when preparation is made, it is preferable that each accumulating device be freely detachable from the line shaft which drives it. Also, for example, in the case of the apparatus shown in FIGURE 3, when the cable unit having 25 quads is to be manufactured, one head of the six groups of the quad stranding accumulating devices must be at a stop while all the rest of the apparatus is operating. In order to make this possible, all the accumulating devices have, as shown in FIGURE 8, a clutch 14 interposed between the shaft 15 directly connected with the cradle 5 to revolve the same and the driven pulley 13 to transmit revolving force to it. If this clutch is put to OFF when necessary, the revolution of 13 is not transmitted to 15, so that 5 can remain stationary.

The apparatus of the present invention which has been explained in detail is a concrete embodiment of the SZ quad stranding assembling machine based on the two-step line speed method. It provides an apparatus of a high utility and efficiency and its industrial value is of greater importance.

What is claimed is:

1. An apparatus for the manufacture of communication cables comprising a plurality of SZ twist stranding devices each consisting of a supply stand containing a plurality of wire feed machines and an accumulating device for stranding which revolves in one fixed direction while accumulating the groups of elementary wires supplied from the supply stand and a device to apply an adhesive to the groups of elementary stranded wires coming out of the accumulating device and a phase regulating device, and an assembling device consisting of means to divide these plurality of stranding devices into a plurality of groups and arrange the SZ twisted wires obtained from each of these groups in a concentric condition and an assembling accumulating device for accumulation of the concentric groups and having an accumulation length approximately equal to that of the aforementioned revolving accumulating device and which revolves in one fixed direction and a compulsory dancer roller device which imparts to the whole of the stranded wires high and low levels of line speed alternately and a take-up device for pulling out the assembled groups of elementary wires at an approximately constant speed, and characterized by a plurality of said assembling device to permit selected groups of said stranding devices to be suitable combined with one or more of said assembling devices for the simultaneous manufacture of one or more cable units with each unit having an independently selected number of said elementary wire groups.

2. An apparatus for the manufacture of communication cables as claimed in claim 1, wherein the compulsory dancer roller device consists of a row of fixed rollers and a row of reciprocally movable rollers, first switch means provided at the ends of the path of reciprocating movement of the row of movable rollers to initiate the reversal thereof and second switch means provided between and adjacent said first switch means to provide the application of an adhesive to the portions of the stranded wires immediately preceding and following the stranding reversal point and including the reversal point.

3. An apparatus for the manufacture of communication cables as claimed in claim 1, wherein a clutch mechanism is provided for a selection of said first mentioned accumulating devices to permit selective disengagement thereof.

References Cited

UNITED STATES PATENTS

| | | | |
|---|---|---|---|
| 3,365,871 | 1/1968 | Schatz et al. | 57—59 |
| 3,369,355 | 2/1968 | Burr | 57—34 |

JOHN PETRAKES, *Primary Examiner.*